Aug. 28, 1962 F. W. PFLEGER ETAL 3,051,955

ERROR INDICATING SYSTEM

Filed Nov. 20, 1957

INVENTORS.
Frederick W. Pfleger
& Roland Y. Noel
BY Morris b. Lebkin
ATTORNEY.

3,051,955
Patented Aug. 28, 1962

3,051,955

ERROR INDICATING SYSTEM

Frederick W. Pfleger, Pennsauken, and Roland Y. Noel, Haddonfield, N.J., assignors to Radio Corporation of America, a corporation of Delaware Filed Nov. 20, 1957, Ser. No. 697,622
11 Claims. (Cl. 346—110)

Figure 1:
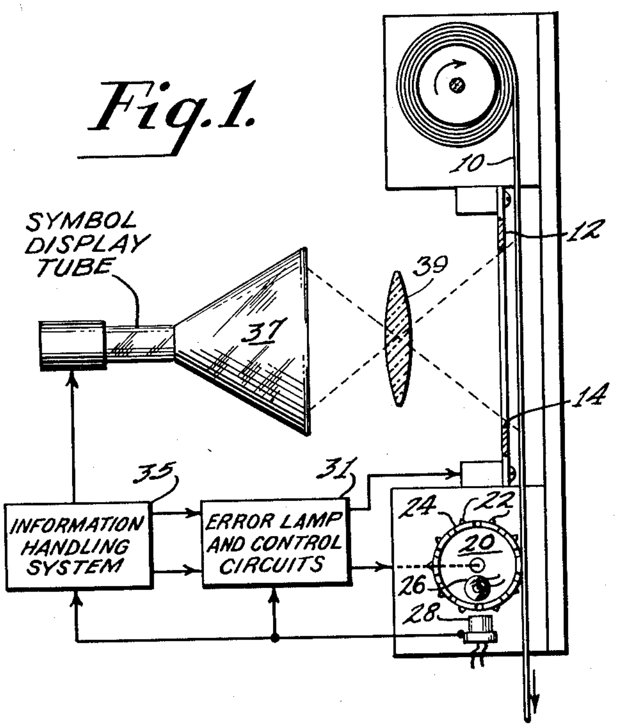

This invention relates to data processing equipment, and more particularly to an error signaling arrangement for data processing equipment.

In recent years, data processing systems have used different output arrangements. For example, symbol display tubes have been produced by various companies. These symbol display tubes may be connected directly to the binary coded signal output of a data processing system and produce the individual code characters in light on the tube face at a rate which is limited only by the writing speed of the tube.

In order to record the data being written on the face of the tube, a photographic technique may be employed. A camera may be positioned at the face of the tube and may be used to record the characters displayed by the phosphor on the tube face. It is desirable in such an output device to signal in some way when an error in the output information is detected within the data processing system so that erroneous data may be distinguished on the record from correct data.

Accordingly, it is an object of the present invention to provide a simple error indicating system which provides a permanent record of an error in an output record.

It is a further object of invention to provide an error signal to an output record, which signal need not otherwise materially alter the contents of the output record.

It is a still further object of invention to provide an inexpensive marking device for recording an error indication on a photographic record which requires few additional components and no additional optical components.

It is a still further object of invention to provide an inexpensive marking device for recording an error marking on a photographic record, said error marking being adjustable in extent.

It is an additional object of invention to provide an error signal for use with a symbol display tube output of a data processing system, which error signal may be recorded without otherwise materially altering the output record produced.

According to the present invention, an error light is provided adjacent the transport path of a photosensitive record medium. This medium may receive and record information from a symbol display tube. When a block of information, such as a page or document or even a single character, is recorded, the medium is advanced. If an error is detected, an error signal from the data processing system causes an error light, suitably masked, to expose a light streak on the medium as the medium advances. The error light may be under control of a memory device, such as a flip-flop. After a pre-selected time delay, the light may be extinguished and the memory device may be reset to await recordation of the next block of information.

Figure 2:
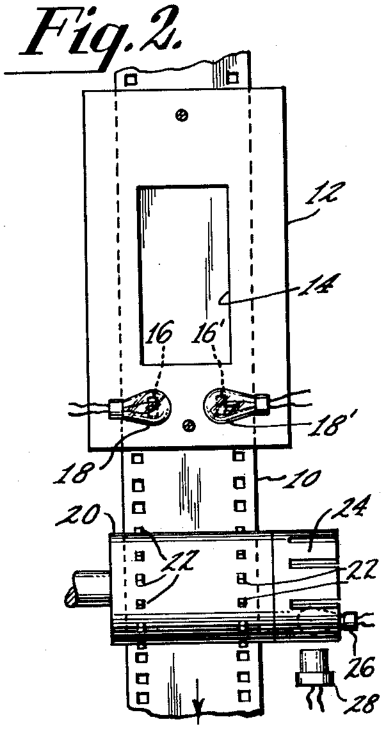
Figure 3:
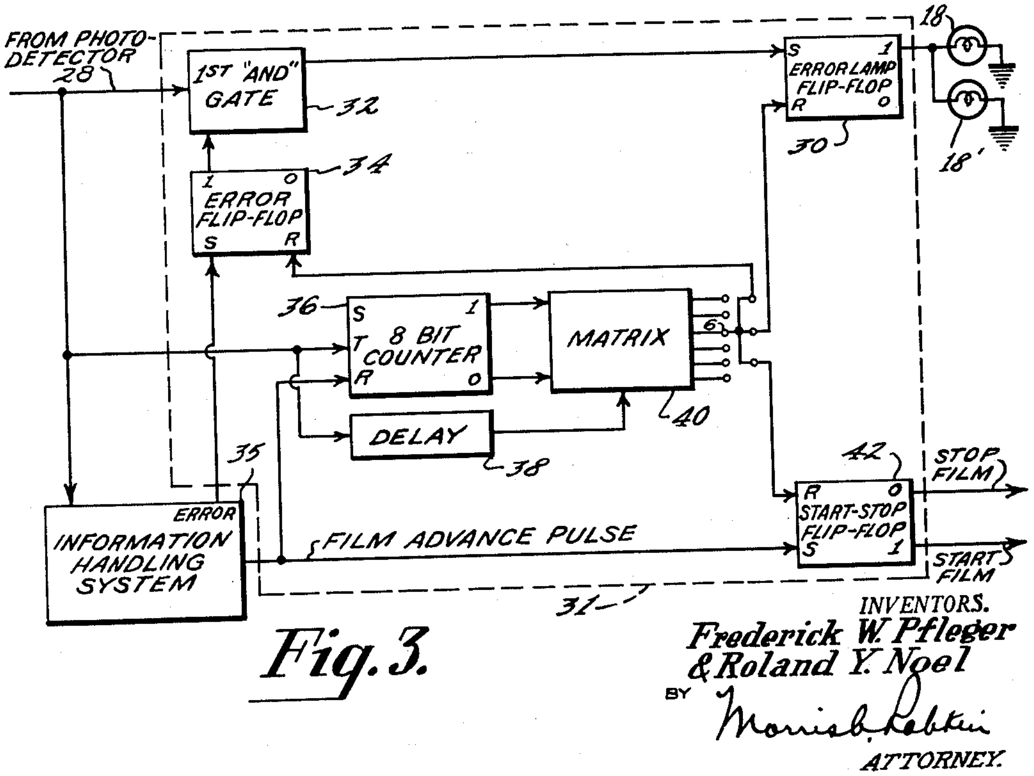

The foregoing and other objects, the advantages, and novel features of this invention, as well as the invention itself both as to its organization and mode of operation, may be best understood from the following description when read in connection with the accompanying drawing, in which like reference numerals refer to like parts, and in which:

FIGURES 1 and 2 schematically portray a portion of a data recording apparatus incorporating an error lamp circuit according to the present invention; and FIGURE 3 is a block diagram of the error lamp circuit of FIGURE 1.

Referring to FIGURES 1 and 2, a photosensitive medium, such as photographic film 10, is used to record successive characters displayed on the face of a symbol display tube 37. An aperture mask 12 frames the film 10 and limits the area of film to be exposed during the transcription of information. The area of exposure may be varied by using various aperture masks 12 with suitable size main apertures 14 or a fixed aperture mask with adjustable main aperture opening. The aperture mask 12 has, in addition to the main aperture 14 (see FIG. 2), error apertures 16 and 16' suitably spaced with respect to main aperture 14 through which may be exposed marginal areas of the film 10. Error lamps 18 and 18' are positioned adjacent the error apertures 16 and 16'.

A capstan 20 having sprocket teeth 22 is connected to a source of motive power (not shown) for transporting the film 10 through the camera. A slotted cylinder 24 is mounted on the capstan and a timing lamp 26 is mounted within the timing cylinder 24. The spacing between cylinder slots corresponds to the distance between 1½ film sprocket teeth. A photodetecting pick-up 28 is placed adjacent the timing cylinder and provides timing pulses as the capstan 20 rotates to advance the film 10.

In FIGURE 3, a block diagram illustrates the error lamp circuits. The error lamps 18 and 18' are shown in schematic form. An error lamp flip-flop 30 is connected to energize the lamps 18 and 18' when in the set state. A flip-flop is a bistable circuit having two conditions of stability, the set state and the reset state. In response to a signal at a set terminal S, the flip-flop assumes one of the stable states, the set state. In response to a signal on a reset terminal R, the flip-flop assumes the other stable state, the reset state. The flip-flop has a "1" output which has a high voltage when the flip-flop is in the set state, and a low voltage (in this case zero or ground) when the flip-flop is in the reset state.

The set terminal S of the error lamp flip-flop 30 is connected to the output of a first "and" gate 32. An "and" gate is a circuit that provides an output only when signals are present on all of the inputs. One input to the first "and" gate 32 is connected to the output of the photodetector 28 of FIGURE 2. A second input to the first "and" gate 32 is provided by the "1" output of an error flip-flop 34 whose set terminal S is connected to an error signal source within an information handling system 35.

The film transport system, not entirely shown, provides signals from the pick-up 28 indicating that the capstan 20 of FIGURE 2 is rotating and therefore transporting film 10. This signal may be applied to the "and" gate 32 from the photo-detector 28, as pointed out above, to a counter 36 and a delay 38, and to an information handling system 35. The information handling system 35 applies binary coded signals to a symbol display tube 37 for the production of output data in symbolic form which may be recorded on the photosensitive film 10. An optical system, shown diagramatically as a lens 39, focuses the tube output on the film 10 through the aperture 14. As a frame of film is exposed, if any errors are detected in the formation handling system, such as transient errors indicated by lack of parity, a signal is applied to the error flip-flop 34, which is then put into the set state thereby to partially enable the first "and" gate 32.

A film advance pulse from the information handling system is applied to the reset terminal of the counter 36 and causes the counter to reset to zero. This film advance pulse is also applied to the set terminal of the start-stop flip-flop 42 which controls the film handling mechanism. Counter 36 and delay 38 also receive timing pulses from photodetector 28. Outputs of the counter and delay are applied to a matrix 40.

After the error has been detected, an error routine, (not described further) is initiated in the information handling system and sets error flip-flop 34. At the conclusion of the error routine, a film advance pulse is applied to the set terminal of the start-stop flip-flop 42 in response to which a motor (not shown) drives the capstan 20 which starts to move the film 10. When the film has moved a distance sufficient so that the film of the last document has completely moved beyond the exposure area of the error lights, a first signal is generated in the photodetector 28 due to a slot on slotted cylinder 24 passing between timing lamp 26 and photodetector 28. This first signal is applied to the second input of the first "and" gate 32. The output of "and" gate 32 sets the error lamp flip-flop 30. The "1" output of the flip-flop 30 then turns on error lights 18, 18'.

This first signal is also applied to counter 36 and delay 38, which control matrix 40. Each successive timing pulse from photodetector 28 steps up the counter 36 and, through delay 38, clocks matrix 40, providing successive output signals to the matrix keyboard terminals corresponding to film travels of 1½, 3, 4½, 6, 7½, and 9 sprocket pitches. The reset terminals of error lamp flip-flop 30, error flip-flop 34, and film start-stop flip-flop 42 are connected respectively to suitable terminals on the matrix beyboard. When the matrix output appears on a keyboard terminal to which a reset terminal is connected, the flip-flop is returned to the reset position. By way of example, all the reset terminals of the flip-flops of FIGURE 3 are connected to the matrix keyboard terminal corresponding to a sprocket pitch of 6. However, these reset terminals may be connected individually to any different keyboard terminal as may be suitable for a particular purpose. The extent of error marking and amount of film pull-down are thereby controlled by preselected connections to the keyboard terminals of matrix 40.

Due to circuit and inertia delay between the time of the photodetector pulse application to counter 36 and final stoppage of film 10, the slotted cylinder 24 will transport some distance after the photodetector pulse is emitted. However, the design may be such that this distance is not more than that corresponding to one-half of a sprocket pitch. As the distance between cylinder slots corresponds to 1½ sprocket pitches, the capstan 20 must transport a distance corresponding to at least one sprocket pitch before the next timing pulse will be applied to the photodetector 28 and, thus, to the "and" gate 32. Error apertures 16 and 16' are separated from main aperture 14 by a distance corresponding to not more than one sprocket pitch. This arrangement prevents the error lights 18 and 18' from being energized until the film has moved a distance sufficient so that the film of the last document is completely beyond the exposure area of the error lights.

Main aperture opening 14 may be suitably chosen to correspond to various size recordings. Proper selection of the matrix keyboard terminal connected to the reset terminal of error lamp flip-flop 30 thus permits, if desired, only those frames or any part of those frames containing errors detected by information handling system 35 to have exposed marginal streaks which serve to identify these erroneous frames.

The information recorded on the frame is not disturbed, however, nor is any information lost. Such frames are then used for diagnostic purposes to determine, if possible, the cause of the errors. The error signaling system is easily constructed, requires no separate optical system, allows adjustment of error margin extent, and may be operated in response to the signals that are readily available from the information handling system and from the film transport system.

Although this invention is described in reference to a film recording system, it is obvious that by changing some of the components, the invention can be used in other photo-sensitive recording systems.

What is claimed is:

1. In a data processing system providing an electrical signal output and an error signal when said output is in error, the combination with a device for recording on a photosensitive medium the output of a symbol display tube adapted to receive and respond to said signal output, of an error signaling circuit comprising error lamp means adapted to expose a marginal portion of said record medium when said lamp means is energized, gate means connected to energize said error lamp means when enabled, first enabling means for said gate means responsive to motion of said photosensitive medium, and second enabling means for said gate means responsive to said error signal, whereby said lamp means exposes a marginal strip of said photosensitive medium after receipt of an error signal.

2. In a data processing system providing a coded electrical signal output and error signals indicating when said output is in error, the combination with a device for recording on a photosensitive medium the output of a symbol display tube adapted to receive and respond to said output, of an error signaling circuit comprising a lamp arranged for exposing when lit, a portion of said medium, a flip-flop having two stable states and connected to said lamp to light said lamp when in one of said states and to extinguish said lamp when in the other of said states, circuit means to derive a signal in response to motion of said medium, and gate means to allow said flip-flop to assume said one state only in response to joint occurrence of said motion signal and one of said error signals.

3. In a data processing system providing a coded electrical signal output, and an error signal indicating when said output is in error, the combintaion with a device for recording on a photosensitive medium the output of a symbol display tube adapted to receive and respond to said output, of an error signaling circuit comprising a lamp arranged to expose when lit a portion of said medium, a flip-flop having two stable states namely, a set state and a reset state, and connected to said lamp to light said lamp when in said set state and to extinguish said lamp when in said reset state, circuit means to derive a motion signal in response to motion of said medium, gate means connected to said flip-flop to allow said flip-flop to assume said set state only in response to joint occurrence of said motion signal and said error signal, and means to cause said flip-flop to assume said reset state after a desired portion of said medium has been exposed to said lamp.

4. In a data processing system providing an electrical signal output, an error signal indicating when said output is in error, and a film advance signal, the combination with a device for recording on a photosensitive medium the output of a symbol display tube adapted to receive and respond to said output and a means to drive said medium in response to said advance signal, of an error signaling circuit comprising a lamp arranged to expose when lit a portion of said medium, flip-flop having two stable states, namely, a set state and a reset state, and connected to said lamp to light said lamp when in said set state and to extinguish said lamp when in said reset state, circuit means to derive a motion signal in response to operation of said drive means, gate means connected to said flip-flop to allow said flip-flop to assume said set state only in response to joint occurrence of said motion signal and of said error signal, and means to cause said flip-flop to assume said reset state after a desired extent of said medium has been exposed to said lamp.

5. In a data processing system providing a coded electrical signal output, and error signals indicating when said output is in error, the combination with a device for recording on a photosensitive medium the output of a symbol display tube adapted to receive and respond to said output, of an error signaling circuit comprising a lamp arranged to expose when lit a marginal portion of said medium, a flip-flop having two stable states namely, a set state and a reset state, and connected to said lamp to light said lamp when in said set state and to extinguish said lamp when in said reset state, circuit means to derive a motion signal in response to motion of said medium, gate means connected to said flip-flop to allow said flip-flop to assume said set state only in response to joint occurrence of said motion signal and of said error signal, and means to cause said flip-flop to assume said reset state after a desired extent of exposure of said medium to said lamp.

6. In a data processing system providing a coded electrical signal output, and error signals indicating when said output is in error, the combination with a device for recording on a photosensitive strip of film the output of a symbol display tube adapted to receive and respond to said output, of an error signaling circuit comprising a lamp arranged to expose when lit a marginal portion of said film, a first flip-flop having two stable states, namely, set and reset states, and connected to said lamp to light said lamp when in said set state and to extinguish said lamp when in said reset state, circuit means to derive a signal indicative of motion of said film, another flip-flop having two stable states, namely, set and reset states, said error signals being applied to said other flip-flop to allow said other flip-flop to assume a set state, an "and" gate connected to receive said motion indicative signal and an output of said other flip-flop as an enabling level when said other flip-flop is in said set state; said "and" gate being connected to said first flip-flop to allow said first flip-flop to assume said set state only in response to joint occurrence of said motion signal and said output of said other flip-flop, and a control circuit connected to receive said motion indicative signal, each of said flip-flops being connected to receive the output of said control circuit and to assume said reset state in response to said control circuit output.

7. In a data processing system providing a coded electrical signal output and error signals indicating when such output is in error, the combination with a device for recording on a photosensitive strip of film the output of a symbol display tube adapted to receive and respond to said output, of an error signaling circuit including a lamp circuit arranged to expose when lit a marginal portion of said film, a flip-flop having two stable states, namely, set and reset states, and connected to said lamp to light said lamp when in said set state and to extinguish said lamp when in said reset state, circuit means to derive a signal indicative of motion of said film, gate means connected to said flip-flop to allow said flip-flop to assume said set state only in response to joint occurrence of said motion signal and of one of said error signals, and a control circuit connected to receive said motion signal, said flip-flop being connected to receive said control circuit output and to assume said reset state in response to said control circuit output.

8. In a data processing system providing a coded electrical signal output, error signals indicating when said output is in error, a medium drive mechanism and a medium advance signal, the combination with a device for recording on a photosensitive medium the output of a symbol display tube adapted to receive and respond to said output, of an error signaling circuit comprising a lamp arranged to expose when lit a marginal portion of said medium and a flip-flop having two stable states, namely, set and reset, and connected to said lamp to light said lamp when in said set state and to extinguish said lamp when in said reset state, circuit means to derive a signal in response to motion of said medium, gate means connected to said flip-flop to allow said flip-flop to assume said set state only in response to joint occurrence of said motion signal and one of said error signals, a second flip-flop having two stable states, namely, set and reset, and connected to said medium drive mechanism to actuate said mechanism in the set state and to stop said mechanism in the reset state, means applying said medium advance signal to said second flip-flop to allow said second flip-flop to assume said set state in response to said film medium advance signal, and means to cause each of said flip-flops to assume said reset states, singly or together, after a desired extent of exposure of said medium to said lamp.

9. In a data processing system providing a coded electrical signal output, error signals indicating when said output is in error, a medium drive mechanism and a medium advance signal, the combination with a device for recording on a photosensitive medium the output of a symbol display tube adapted to receive and respond to said output, of an error signaling circuit comprising a lamp arranged to expose when lit a marginal portion of said medium, a first flip-flop having two stable states, namely, set and reset, and connected to said lamp to light said lamp when in said set state and to extinguish said lamp when in said reset state, circuit means to derive timing signals in response to motion of said medium, gate means connected to said flip-flop to allow said flip-flop to assume said set state only in response to joint occurence of said motion timing signal and one of said error signals, means for delaying the first of said timing signals until said medium has moved a distance sufficient so that the portion of said medium containing the last recording is beyond the range of said error lamp, a second flip-flop having two stable states, namely, set and reset, and connected to said medium drive mechanism to drive said mechanism when said second flip-flop is in the set state, and to stop said drive mechanism when said second flip-flop is in the reset state, means for applying said medium advance signal to said second flip-flop to allow said second flip-flop to assume the set position in response to the said medium advance signal, a control stage comprising a counter, a delay, and a matrix, means for applying outputs of said counter and said delay to said matrix, means for applying said medium advance signal and said medium motion timing signals to the input of said counter, means for applying said motion timing signals to said delay, said medium advance signal to set said counter to zero, said motion timing signals to step up said counter, said motion timing signals to clock said matrix through said delay, a matrix output terminal board, means for applying output of said matrix in sequence to terminals of said matrix output terminal board, said sequence corresponding to said motion timing signals, and means for connecting the reset terminals of said first flip-flop and said second flip-flop to the same or separate terminals of said matrix output terminal board, said connections allowing selected timing operations of said flip-flops.

10. In a data processing system providing data output in the form of electrical signals and an error signal when said data output is in error, the combination of an optical display device responsive to said electrical signals for displaying said data output optically as appropriate light patterns, with a light-sensitive recording medium responsive to said light patterns, means for moving said medium relative to said display device, means for generating control signals as said medium moves, and an error signaling circuit comprising lamp means energized in response to the joint occurrence of a said error signal and one of said control signals for illuminating a marginal portion of said medium, whereby incorrect data is identified on the medium without otherwise affecting the recorded light patterns.

11. In a data processing system providing data output in the form of electrical signals and an error signal when said data output is in error, the combination of a device for recording on a radiation-sensitive medium the output of a radiation-emitting display device responsive to said electrical signals for displaying said output data as appropriate patterns of said radiation, with an error signaling circuit comprising a lamp arranged for exposing, when lit, a portion of said medium, a bistable circuit connected to said lamp for lighting said lamp when said bistable circuit is in one stable state and to extinguish said lamp when said bistable circuit is in the other said stable state, means for deriving control signals in response to motion of said medium, means for triggering said bistable circuit to said one stable state in response to each said error signal, and means responsive to said control signals for triggering said bistable circuit to said other stable state after a predetermined number of said control signals following said error signal.

References Cited in the file of this patent

UNITED STATES PATENTS

| | | |
|---|---|---|
| 2,354,836 | Rusch | Aug. 1, 1944 |
| 2,596,741 | Tyler et al. | May 13, 1952 |
| 2,649,016 | Fairbanks | Aug. 18, 1953 |
| 2,675,962 | Couffignal | Apr. 20, 1954 |
| 2,682,573 | Hunt | June 29, 1954 |
| 2,720,642 | Blakely | Oct. 11, 1955 |
| 2,793,344 | Reynolds | May 21, 1957 |
| 2,795,645 | Thieneman | June 11, 1957 |
| 2,828,362 | Darwin et al. | Mar. 25, 1958 |
| 2,871,289 | Cox et al. | Jan. 27, 1959 |
| 2,937,914 | Blake | Oct. 3, 1960 |

UNITED STATES PATENT OFFICE

CERTIFICATE OF CORRECTION

Patent No. 3,051,955 August 28, 1962

Frederick W. Pfleger et al.

It is hereby certified that error appears in the above numbered patent requiring correction and that the said Letters Patent should read as corrected below.

Column 2, line 63, for "formation" read -- information --; column 3, line 30, for "beyboard" read -- keyboard --; column 6, line 7, strike out "film"; column 8, line 14, for "Oct. 3, 1960" read -- May 24, 1960 --.

Signed and sealed this 19th day of February 1963.

(SEAL)
Attest:

ESTON G. JOHNSON
Attesting Officer

DAVID L. LADD
Commissioner of Patents